Feb. 16, 1965  V. H. BLACKMAN ETAL  3,170,077
APPARATUS FOR GENERATING ELECTRICAL ENERGY
Filed March 20, 1961

Inventors
Vernon H. Blackman
Anthony Demetriades
Malcolm S. Jones, Jr.
by Thomas F. Kirby
Attorney

3,170,077
APPARATUS FOR GENERATING ELECTRICAL ENERGY

Vernon H. Blackman, Laguna Beach, Anthony Demetriades, Pasadena, and Malcolm S. Jones, Jr., Corona del Mar, Calif., assignors to Allis-Chalmers Manufacturing Company, Milwaukee, Wis., and MHD Research, Inc., Newport Beach, Calif.
Filed Mar. 20, 1961, Ser. No. 96,866
15 Claims. (Cl. 310—11)

This invention relates generally to apparatus for generating electrical energy by moving electrically conductive fluid through a magnetic flux field.

More particularly, it relates to means for increasing the electrical output of such apparatus by increasing the electrical conductivity of predetermined portions of the conductive fluid moving through the magnetic flux field.

One type of magneto-hydrodynamic (MHD) electrical generator comprises an elongated conduit, means for establishing a magnetic flux field transverse to the longitudinal axis of the conduit and spaced apart electrodes within the conduit orientated so that the shortest path between them is transverse to the longitudinal axis of the conduit and transverse to the lines of force of the magnetic flux field. When an electrically conductive fluid is moved at high velocity through the magnetic flux field in the conduit, electrical current flow is generated in the fluid between the electrodes in accordance with Fleming's well known "Right Hand Rule."

In practice, the fluid is usually a gas heated, for example, to about 3500° K. which is produced by burning fuel reactants together in a combustion chamber. This gas is released through a nozzle to control its velocity and is then directed through the conduit. Ordinarily, such hot gas is not sufficiently electrically conductive to produce the desired electrical effect but it can be made so by the addition of "seeding" material thereto during combustion. Seeding materials are those, such as potassium or cesium, for example, which ionize quite readily at predetermined high temperatures. Seeding materials can be employed in the gaseous or liquid state or even as finely divided powders, if their nature permits.

It is an object of this invention to extract additional amounts of electrical power from MHD electrical generators of the aforedescribed type by increasing the electrical conductivity of the fluid moving through the so-called "electrode boundary layers" in the conduit i.e., those regions in the conduit adjacent the electrode surfaces, while simultaneously maintaining the electrical conductivity of the fluid upstream and downstream of the electrodes at its original level.

Another object is to increase electrical conductivity of the fluid moving through the aforesaid electrode boundary layers by introducing additional seeding material into the already electrically conductive fluid in the conduit, confining its dispersion principally to the electrode boundary layers, and effecting ionization of the additional seeding material prior to its dispersion into the electrode boundary layers.

Another object is to provide improved means for introducing the aforesaid additional seeding material into the electrode boundary layers and for effecting its ionization prior to its entry into the electrode boundary layers.

Another object is to provide improved means for introducing specific types of seeding material into the electrode boundary layers and for effecting ionization of such specific types of seeding material by the application of heat thereto.

A more specific object is to provide means for introducing particular types of seeding material, such as cesium or potassium in the gaseous state, into the conduit near the upstream ends of the electrodes for dispersion through the electrode boundary layers and for effecting ionization of those particular types of seeding material by having them make physical contact with hot tungsten.

Another more specific object is to provide means for introducing particular types of seeding material, such as a potassium compound dissolved in a combustible solution, into the conduit near the upstream ends of the electrodes, effecting combustion of the aforesaid solution in the conduit, and dispersing the ionized by-products of such combustion into the electrode boundary layers.

Other objects and advantages of the invention will hereinafter appear.

The accompanying drawing illustrates several preferred embodiments of the invention, but it is to be understood that the embodiments illustrated are susceptible of modifications with respect to details thereof without departing from the scope of the appended claims.

Figure 1:
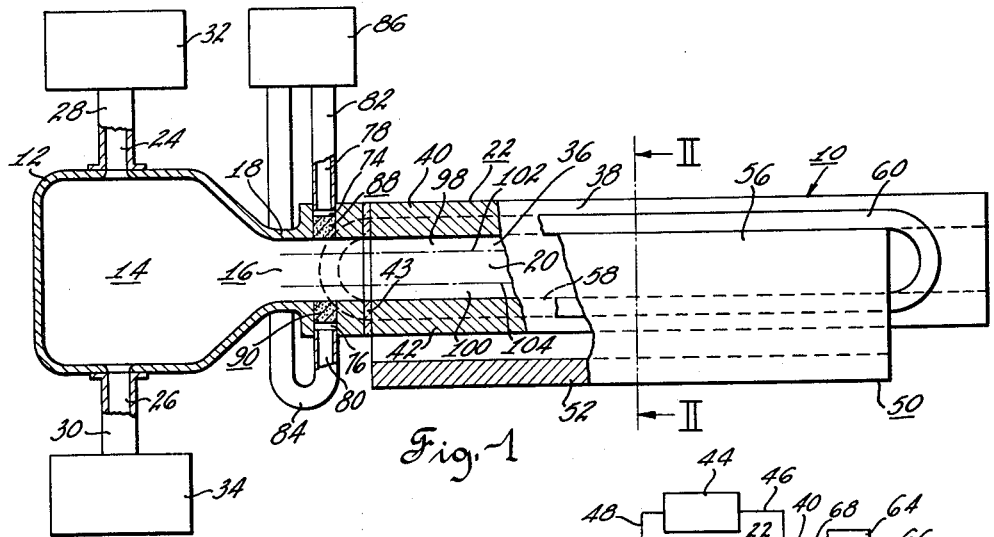
FIG. 1 is an elevational view of an MHD electrical generator incorporating one embodiment of the present invention with portions thereof broken away to illustrate details.

Referring now to FIG. 1 of the drawing, the numeral 10 designates an MHD electrical generator incorporating a first embodiment of the present invention. Generator 10 comprises a burner 12 having a combustion chamber 14 therewithin which is connected through a throat 16 in a transition section or nozzle section 18 to a passage 20 in a conduit section 22, hereinafter more particularly described. Because of the extremely high temperatures involved it is necessary that burner 12 and all other components in MHD generator 10 which are exposed to such temperatures be fabricated of heat-resistant metal alloys, ceramic materials or other suitable heat-resistant substances.

Combustion chamber 14 of burner 12 is connected through passages 24 and 26 in tubes 28 and 30, respectively, to a source 32 of fuel reactants and a source 34 of seeding material, respectively. Although a wide variety of fuel reactants could be burned together in combustion chamber 14 of burner 12 to afford a suitable supply of hot gas for passage 20 in conduit section 22, assume for example, that kerosene, alcohol and oxygen are employed as fuel reactants, that they are supplied from source 32 under high pressure, and that they produce a gas initially heated to about 3500° K.

In practice, any seeding material that ionizes readily at the temperatures involved could be employed to provide an electrically conductive mixture of hot gas and ionized seeding material. It is convenient, however, to employ potassium hydroxide dissolved in alcohol and supplied under pressure from source 34 since that solution is well adapted to be burned along with the fuel reactants in combustion chamber 14 of burner 12 to effect seeding of the gas at the temperatures involved.

Figure 2:
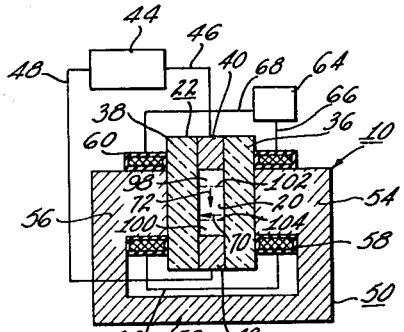
FIG. 2 is a cross-sectional view taken along line II—II of FIG. 1.

FIGS. 1 and 2 show that passage 20 in conduit section 22 of generator 10 is defined by a pair of spaced apart side walls 36 and 38 which are fabricated of heat resistant electrical insulating material and a pair of spaced apart top and bottom walls 40 and 42, respectively, which are fabricated of heat resistant electrically conductive material. The top and bottom walls 40 and 42, which are electrically insulated from transition section 18 of burner 12 by a heat resistant member 43, serve as electrodes for collecting electrical power produced in generator 10 and, as FIG. 2 shows, are adapted for electrical connection to a suitable load 44 by conductor wires 46 and 48, respectively.

Generator 10 is further provided with an electromagnet 50, shown in FIGS. 1 and 2, for establishing a magnetic flux field in passage 20 in conduit section 22 transverse to the longitudinal axis of the passage and transverse to a path between the electrodes 40 and 42. Electromagnet 50 comprises an elongated C-shaped core 52 having poles 54 and 56 which are disposed adjacent the side walls 36 and 38, respectively, of conduit section 22 and which are provided with suitable energizing windings 58 and 60, respectively. As FIG. 2 shows, the windings 58 and 60 are serially connected to each other by a conductor wire 62 and are connected to a suitable source 64 of direct current electrical power by conductor wires 66 and 68, respectively. It may be assumed for example, that the windings 58 and 60 are wound, arranged and energized in such a manner that the poles 54 and 56, respectively, of core 52 are north and south poles and that the magnetic flux field generated by electromagnet 50 proceeds in the direction of an arrow 70 shown in FIG. 2. It will be understood, therefore, that when generator 10 is in operation, electrical current flow in passage 20 in conduit section 22 is in the direction of an arrow 72 shown in FIG. 2; electron flow being understood to be in the opposite direction. It is to be understood that, although an electromagnet is shown, a permanent magnet (not shown) or induction coils (not shown) could be employed to produce the desired magnetic flux field.

FIG. 1 shows that in accordance with the first embodiment of the invention, transition section 18 of generator 10 is provided with apertures 74 and 76 which communicate with throat 16 thereof as close as is practical to the upstream ends of the top and bottom electrodes 40 and 42, respectively. The apertures 74 and 76 are connected through passages 78 and 80, respectively, in tubes 82 and 84, respectively, to a secondary source 86 of pressurized seeding material. It may be assumed, for example, that the seeding material supplied from secondary source 86 is cesium or potassium in the gaseous state, although other seeding materials could be employed, provided, however, that their nature is such that they ionize readily upon making momentary physical contact with tungsten which has been heated to about 1500° K. or above. The apertures 74 and 76 are further provided with plugs 88 and 90, respectively, which are preferably fabricated of porous tungsten and are provided with a multiplicity of interconnected interstices 92, shown in FIG. 3, which accommodate the flow of the seeding material therethrough. If preferred, however, the plugs 88 and 90 could take the form of a solid tungsten plug 94, shown in FIG. 4, which has a multiplicity of passages 96 therein. As FIGS. 1 and 3 make clear, the tungsten plugs 88 and 90 are situated in such a manner with respect to burner 12 and the hot gas flowing therefrom so as to be heated to the required temperature to effect ionization of the seeding material flowing through the interstices 92 therein. Obviously, however, the plugs 88 and 90 could be heated to the required temperature by other suitable means (not shown) if the particular arrangement disclosed were impractical in a given installation.

The apertures 74 and 76 with the tungsten plugs 88 and 90, respectively, therein are of such size, shape and disposition with respect to throat 16 of transition section 18 of generator 10, that the additional ionized seeding material entering throat 16 is dispersed principally into regions in passage 20 of conduit section 22 hereinafter referred to as the upper and lower electrode boundary layers 98 and 100, respectively.

Figure 3:
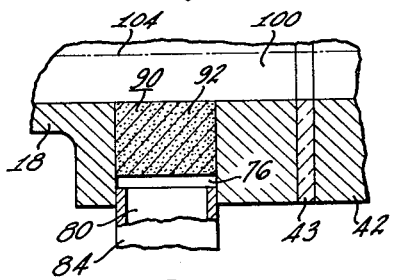
FIG. 3 is an enlarged cross-sectional view of a portion of the apparatus shown in FIG. 1.
Figure 4:
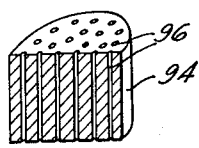
FIG. 4 is an oblique view of an alternative type of plug that may be employed in place of the plug shown in FIG. 3 with a portion thereof broken away to show interior details thereof.

As FIGS. 1 and 2 make clear, upper electrode boundary layer 98 is a region in passage 20 of conduit section 22 bounded by the insulating side walls 36 and 38, by the surface of upper electrode 40 and, for example, by a plane whose edges are depicted by dotted lines 102. Similarly, as FIGS. 1, 2 and 3 show, lower electrode boundary layer 100 is a region in passage 20 of conduit section 22 bounded by the insulating side walls 36 and 38, by the surface of lower electrode 42, and by, for example, a plane whose edges are depicted by dotted lines 104. It is to be understood, however, that in practice the electrode boundary layers 98 and 100 are not as definitely defined as disclosed herein and are not necessarily of the relative thickness disclosed herein.

Figure 5:
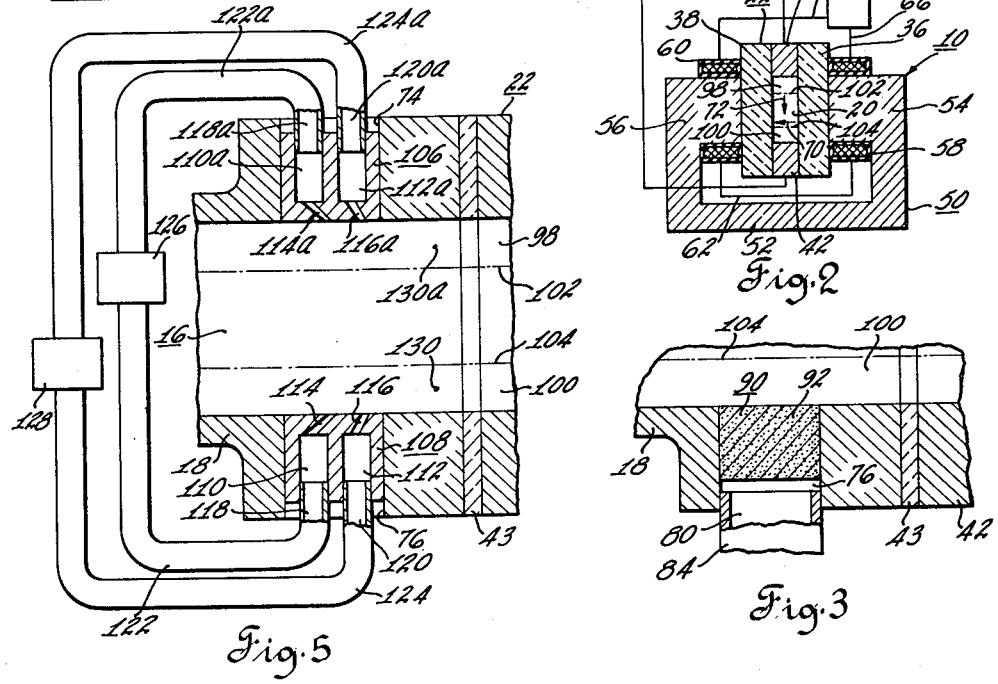
FIG. 5 is an enlarged cross-sectional view of a portion of the MHD electrical generator shown in FIG. 1 but showing it incorporating another embodiment of the present invention.

FIGS. 5 discloses a second embodiment of the invention wherein the apertures 74 and 76 in transition section 18 of generator 10, instead of being provided with tungsten plugs, are provided with plugs 106 and 108, respectively, which may be fabricated of metal or other suitable heat resistant materials. The plugs 106 and 108 are substantially identical to each other in construction, arrangement and function and therefore only the latter plug 108 will be described in detail. Plug 108 is provided with a pair of spaced apart chambers 110 and 112 having nozzles or orifices 114 and 116, respectively, which communicate with throat 16 in transition section 18 of generator 10 and are hereinafter more particularly described. The chambers 110 and 112 in plug 108 are connected through passages 118 and 120, respectively, in tubes 122 and 124, respectively, to a source 126 of oxygen under pressure and a source 128 of seeding material dissolved in a combustible solution under pressure, respectively. In practice, the seeding material may be assumed to be potassuim hydroxide and the combustible solution in which it is dissolved may be assumed to be alcohol, although other seeding material and suitable combustible solvents could be employed. Referring again to the nozzles or orifices 114 and 116 in plug 108, it is to be understood that they are of such size, shape and disposition that they aim their respective separate streams of fluid so that the streams come together approximately at a point 130 which is located within lower electrode boundary layer 100. It is to be understood that when the oxygen from source 126 and the seeding material in the combustible solution from source 128 converge at point 130, the high ambient temperature preexisting at point 130 causes combustion and the resultant products of combustion, including ionized seeding material, are dispersed through lower electrode boundary layer 100.

As FIG. 5 shows, plug 106 is provided with chambers 110a and 112a having orifices 114a and 116a, respectively, and the chambers are connected through passages 118a and 120a, respectively, in tubes 122a and 124a, respectively, to source 126 of oxygen and source 128 of seeding material dissolved in the combustible solution, respectively. The orifices 114a and 116a are aimed to discharge their respective fluid streams toward a point 130a in upper electrode boundary layer 98.

The first embodiment of the invention hereinbefore described operates in the following manner.

Assume that the windings 58 and 60 of electromagnet 50 of generator 10 are energized from source 64 and that a magnetic flux field is established in the direction of arrow 70 (see FIG. 2) in passage 20 in conduit section 22 between the poles 54 and 56. Further, assume that fuel reactants from source 32 and seeding material from primary source 34 are being introduced under pressure through the passages 24 and 26, respectively, in the tubes 28 and 30, respectively, into combustion chamber 14 of burner 12 and are being burned together therein to provide an electrically conductive mixture of hot gas and ionized seeding material which is being supplied at high velocity to passage 20 in conduit section 22 of generator 10. As the electrically conductive mixture passes through the magnetic flux field and between the electrodes 40 and 42, electrical current flow is generated in the mixture in the direction of arrow 72 (see FIG. 2) and current flows from electrode 42 through conductor wire 48, load 44 and conductor wire 46, to electrode 40.

As explained hereinbefore, additional electrical power can be extracted from generator 10 by increasing the electrical conductivity of the mixture moving through the upper and lower electrode boundary layers 98 and 100, respectively, or either of them.

In accordance with the first embodiment of the invention, as FIGS. 1 and 3 make clear, cesium or potassium in the gaseous state is introduced under pressure from secondary source 86 through the passages 78 and 80 in the tubes 82 and 84, respectively, and passes through interstices 92 in the porous tungsten plugs 88 and 90, respectively, which are heated to the temperature required to effect ionization of the cesium or potassium atoms. The cesium or potassium gas, thus ionized, enters throat 16 in transition section 18 and, because of the size and location of the apertures 74 and 76 and because of aerodynamic conditions within the throat, is dispersed through the upper and lower electrode boundary layers 98 and 100, respectively, to increase the electrical conductivity of the mixture already moving therethrough. The increase in electrical conductivity thus effected results in increased electrical current flow through load 44.

In accordance with the second embodiment of the invention, as FIG. 5 makes clear, oxygen from source 126 is introduced under pressure through the passage 118 and 118a in the tubes 122 and 122a, respectively, into the chambers 110 and 110a, respectively, in the plugs 108 and 106, respectively, from whence it is discharged through the orifices 114 and 114a into throat 16 of transition section 18 of generator 10. Because of the size, shape and disposition of the orifices 114 and 114a and because of aerodynamic conditions within throat 16 of transition section 18 the streams of oxygen follow paths toward the points 130 and 130a, respectively, in the lower and upper electrode boundary layers 100 and 98, respectively.

Simultaneously, seeding material, such as potassium hydroxide, dissolved in a combustible solution, such as alcohol, is introduced under pressure from source 128 through the passages 120 and 120a in the tubes 124 and 124a, respectively, into the chamber 112 and 112a, respectively, in the plugs 108 and 106, respectively, from whence it is discharged through the orifices 116 and 116a into throat 16 of transition section 18 of generator 10. Because of the size, shape and disposition of the orifices 116 and 116a and because of aerodynamic conditions within throat 16 of transition section 18, the streams of seeding material dissolved in combustible solution follow paths toward the points 130 and 130a, respectively, in the lower and upper electrode boundary layers 100 and 98, respectively.

When the streams of oxygen from the orifices 114 and 114a in the plugs 108 and 106, respectively, merge or coalesce with the streams of seeding material dissolved in combustible solution from the orifices 116 and 116a, respectively, at the points 130 and 130a, respectively, high ambient temperature conditions in passage 20 of conduit section 22 cause combustion, and the resultant combustion products, including atoms of seeding material which ionized during combustion, are dispersed through the lower and upper electrode boundary layers 100 and 98 to increase the electrical conductivity of the electrically conductive mixture of hot gas and ionized seeding material already moving therethrough. The increase in electrical conductivity thus effected results in increased electrical output from the generator.

It is to be understood that while maximum increase in electrical output is achieved by increasing the electrical conductivity of both electrode boundary layers in a particular MHD electrical generator, some increase in output is achieved by merely increasing the electrical conductivity of one of the electrode boundary layers.

What we claim is:

1. In apparatus for transforming energy in a moving stream of fluid into electrical energy, in combination, a moving stream of electrically conductive fluid, electrode means in contact with said moving stream of electrically conductive fluid, said electrode means having a region adjacent the surface thereof which is characterized as an electrode boundary layer, and means for increasing the electrical conductivity of only that portion of said electrically conductive fluid which moves through said electrode boundary layer.

2. In apparatus for transforming energy in a moving stream of fluid into electrical energy, in combination, a moving stream of electrically conductive fluid, electrode means in contact with said moving stream of electrically conductive fluid, said electrode means having a region adjacent the surface thereof which is characterized as an electrode boundary layer, and means for introducing ionized material into only that portion of said electrically conductive fluid which moves through said electrode boundary layer to increase the electrical conductivity of said electrode boundary layer.

3. The combination according to claim 2 wherein the said means for introducing ionized material is disposed upstream of said electrode means and effects ionization of said material by exposure thereof to hot tungsten.

4. The combination according to claim 2 wherein the said means for introducing ionized material is disposed upstream of said electrode means and effects ionization of said material by exposure thereof to combustion processes.

5. In apparatus for transforming energy in a moving stream of fluid into electrical energy, in combination, a moving stream of electrically conductive fluid, electrode means in contact with said moving stream of electrically conductive fluid, said electrode means having a region adjacent the surface thereof which is characterized as an electrode boundary layer, and means including a source of alkali metal atoms for introducing ionized alkali metal atoms into said electrode boundary layer to increase the electrical conductivity of said electrode boundary layer, said means comprising a tungsten member adapted to be heated above a predetermined temperature and to have the said alkali metal atoms make physical contact therewith to effect ionization of said atoms.

6. In apparatus for transforming energy in a moving stream of fluid into electrical energy, in combination, a moving stream of hot electrically conductive fluid, electrode means in contact with said moving stream of hot electrically conductive fluid, said electrode means having a region adjacent the surface thereof which is characterized as an electrode boundary layer, and means including a source of ionizable atoms in a combustible solution for introducing ionized atoms only into said electrode boundary layer to increase the electrical conductivity of said electrode boundary layer, said means being adapted to effect combustion of said solution as the latter is heated by said hot electrically conductive fluid and to effect ionization of said atoms.

7. In apparatus for transforming energy in a moving stream of fluid into electrical energy, in combination, a moving stream of electrically conductive fluid, electrode means in contact with said moving stream of electrically conductive fluid, said electrode means having a region adjacent the surface thereof which is characterized as an electrode boundary layer, a source of alkali metal atoms, and means for introducing said alkali metal atoms into said moving stream of electrically conductive fluid and for confining their dispersion to said electrode boundary layer, said means comprising a hot tungsten member having passages therein through which said atoms pass for ionization prior to their entry into said electrode boundary layer.

8. In apparatus for transforming energy in a moving stream of fluid into electrical energy, in combination, a moving stream of hot electrically conductive fluid, electrode means in contact with said moving stream of hot electrically conductive fluid, said electrode means having a region adjacent the surface thereof which is characterized as an electrode boundary layer, a source of ionizable atoms in a combustible solution, a source of oxygen, and means for introducing separate streams of said solution and said oxygen into said moving stream of hot electrically conductive fluid and for effecting mixture of said separate streams at a predetermined location in said moving stream of hot electrically conductive fluid whereupon combustion occurs as a result of heating by said hot electrically conductive fluid and said atoms are ionized, said means being adapted to effect dispersion of said ionized atoms only into said electrode boundary layer.

9. The method of increasing the electrical power output of an MHD electrical power generator having a flow channel for electrically conductive fluid and electrode means along said channel which comprises increasing the level of ionization of said fluid in an electrode boundary layer above the level of ionization of said fluid elsewhere in said channel.

10. The method of increasing the electrical power output of an MHD electrical power generator having a flow channel for electrically conductive fluid and electrode means along said channel which comprises the step of adding seeding material to said fluid passing through the electrode boundary layers to increase the level of ionization thereof above the level of ionization elsewhere in said channel.

11. The method of increasing the electrical power output of an MHD electrical power generator having a flow channel for electrically conductive fluid and electrode means along said channel which comprises the steps of adding seeding material to said fluid and confining its dispersion to an electrode boundary layer adjacent said electrode means to increase the ionization of said electrode boundary layer.

12. The method of increasing the electrical power output of an MHD electrical power generator having a flow channel for electrically conductive fluid and electrode means along said channel which comprises the steps of exposing seeding material to means for effecting ionization of the seeding material, introducing the seeding material thus ionized into said flow channel, and confining its dispersion to an electrode boundary layer adjacent said electrode means to increase the ionization of said electrode boundary layer.

13. The method of increasing the electrical power output of an MHD electrical power generator having a flow channel for electrically conductive fluid and electrode means along said channel which comprises the steps of exposing cesium to hot tungsten to effect ionization of the cesium, introducing the cesium thus ionized into said flow channel, and confining its dispersion to an electrode boundary layer adjacent said electrode means to increase the ionization of said electrode boundary layer.

14. The method of increasing the electrical power output of an MHD electrical power generator having a flow channel for hot electrically conductive fluid and electrode means along said channel which comprises the steps of injecting a combustible solution containing seeding material into said flow channel wherein it is heated to ignition temperature by said hot electrically conductive fluid, injecting a fuel reactant into said flow channel wherein it makes contact with said combustible solution to effect combustion of said solution and effecting dispersion of ionized by-products of combustion into an electrode boundary layer adjacent said electrode means to increase the ionization of said electrode boundary layer above the level of ionization of said fluid elsewhere in said channel.

15. The combination according to claim 14 wherein said combustible solution comprises alcohol in which potassium hydroxide is dissolved and wherein said fuel reactant comprises oxygen.

References Cited in the file of this patent

UNITED STATES PATENTS

| 1,717,413 | Rudenberg | June 18, 1929 |
| 2,210,918 | Karlovitz | Aug. 13, 1940 |
| 3,106,061 | Eder | Oct. 8, 1963 |

OTHER REFERENCES

"Magnetohydrodynamics — Future Power Process?" Power (Design and Equipment Application Section), November 1959, pp. 62–65.

"Magnetohydrodynamic Generators," by Way, Westinghouse Engineer, July 1960 pp. 105–107.